June 10, 1952  T. H. WHALEY, JR  2,600,039
DUAL PHASE CONTROL
Filed Nov. 17, 1947  4 Sheets-Sheet 1

INVENTOR.
T.H. WHALEY, JR.
BY Hudson L Young
ATTORNEYS

INVENTOR.
T.H. WHALEY, JR.
BY Hudson & Young
ATTORNEYS

June 10, 1952  T. H. WHALEY, JR  2,600,039
DUAL PHASE CONTROL

Filed Nov. 17, 1947  4 Sheets-Sheet 4

INVENTOR.
T.H. WHALEY, JR.
BY Hudson & Young
ATTORNEYS

Patented June 10, 1952

2,600,039

UNITED STATES PATENT OFFICE 2,600,039

DUAL PHASE CONTROL

Thomas H. Whaley, Jr., Mount Vernon, N. Y., assignor to Phillips Petroleum Company, a corporation of Delaware Application November 17, 1947, Serial No. 786,441

7 Claims. (Cl. 137—68)

This invention relates to process control. In one of its more specific aspects it relates to the control of a second liquid phase in processing, wherein the second liquid phase may or may not be desired.

I have devised an apparatus which operates to indicate and/or remove a second liquid phase which floats upon a heavier liquid phase, the second and lighter liquid phase may or may not be desired.

For example, in the extractive distillation of butylene containing stocks with furfural wherein the butylenes are extracted by or dissolved in the furfural, this mixture settles to the bottom of the extraction vessel as a heavy liquid phase. The remaining hydrocarbons which boil at about the same temperature as the butylenes are intended to distill overhead as vapors from this extraction column. Conditions exist at times wherein all of these remaining hydrocarbons are not distilled overhead and are not dissolved in the furfural, but collect and float as a separate liquid layer upon the surface of the furfural or furfural-butylene mixture. When such a condition exists, the operation is far from that desired. I have devised an apparatus for indicating and/or removing such a second liquid phase once it is formed and floats upon the heavier liquid phase.

One object of my invention is to provide a method for process control. Another object of my invention is to provide a method for control of two liquid phases in a process vessel. Still another object of my invention is to provide a method for the control of an undesired second liquid phase in a process vessel. Still other objects and advantages will be appreciated by those skilled in the art upon reading the following disclosure and drawing, which respectively describes and illustrates the apparatus of my invention.

Figure 1:
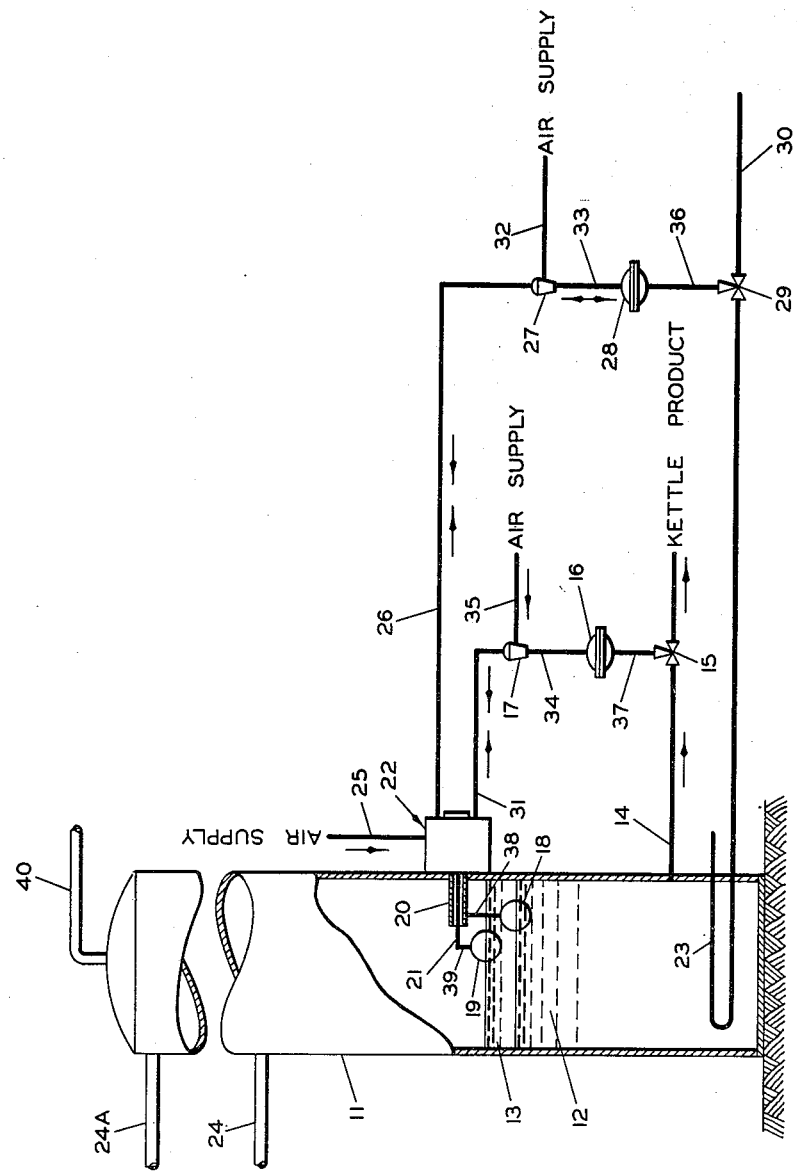
Figure 1 shows partly in elevation and partly in section one application of my invention.

Referring now to the drawing and specifically to Figure 1, reference numeral 11 refers to a column or other vessel containing the liquid phases to be controlled. In the bottom of the vessel is a heavier liquid phase 12 and floating upon that heavier liquid is a lighter liquid phase 13. The heavier liquid 12, sometimes termed the kettle or reboiler product in fractionators, may be withdrawn through a pipe 14 controlled by a valve 15 to such disposal as desired. Valve 15 is a motor valve operated by a motor 16. The motor 16 in turn is operated by air, from a source not shown, coming through line 35, through a pilot valve 17, through line 34 to the motor 16. Motor 16 then operates the valve 15 through a valve stem linkage 37. The pilot valve 17 is operated by air pressure from line 31 and coming originally from an air supply, not shown, through line 25 and control unit 22. Control unit 22 also controls air from line 25 to pipe 26, which air in turn operates a pilot valve 27. This pilot valve 27 controls air, originating at a source not shown, and passing through a line 32 to a pipe 33 for operating a motor 28. This motor 28, by way of a linkage 36, operates a motor valve 29 for controlling fluid flowing in line 30.

Within the vessel 11 is a float 18 adapted to be responsive to the height of the surface of the heavier liquid phase 12. In case a lighter liquid phase is also present, this float 18 is intended to remain suspended at the interface between the two liquid phases. The float 18 is connected by an arm 38 to a tube 20, which in turn extends through the wall of the vessel 11 and terminates within the indicator control panel box 22. The float 19 is intended to float upon the surface of the lighter liquid phase 13 in case the lighter liquid phase is present. This float 19 is connected by an arm 39 to a shaft 21 which also extends through the wall of the vessel 11 and terminates in the indicator control panel box 22. As shown in Figure 1, the shaft 21 passes through the center of the hollow tube 20 and accordingly the shaft 21 and tube 20 pass through a common opening in the wall of the vessel 11. In this manner only one opening in the wall of vessel 11 need be provided for accommodating my control apparatus.

In the bottom of vessel 11 and within the heavy liquid phase may be a heating coil 23 for reboiling purposes, if desired, or an external reboiler may be used.

In the upper section of the vessel 11 is an inlet pipe 24 for admitting hydrocarbon or other feed stocks into the vessel 11. In a still higher section of the vessel 11 is an inlet pipe 24A through which may be admitted a heavier liquid which ultimately accumulates as the lower liquid phase 12. From the top of the column 11 is a pipe 40 through which distillation vapors may pass to further processing, as desired.

Figure 2:
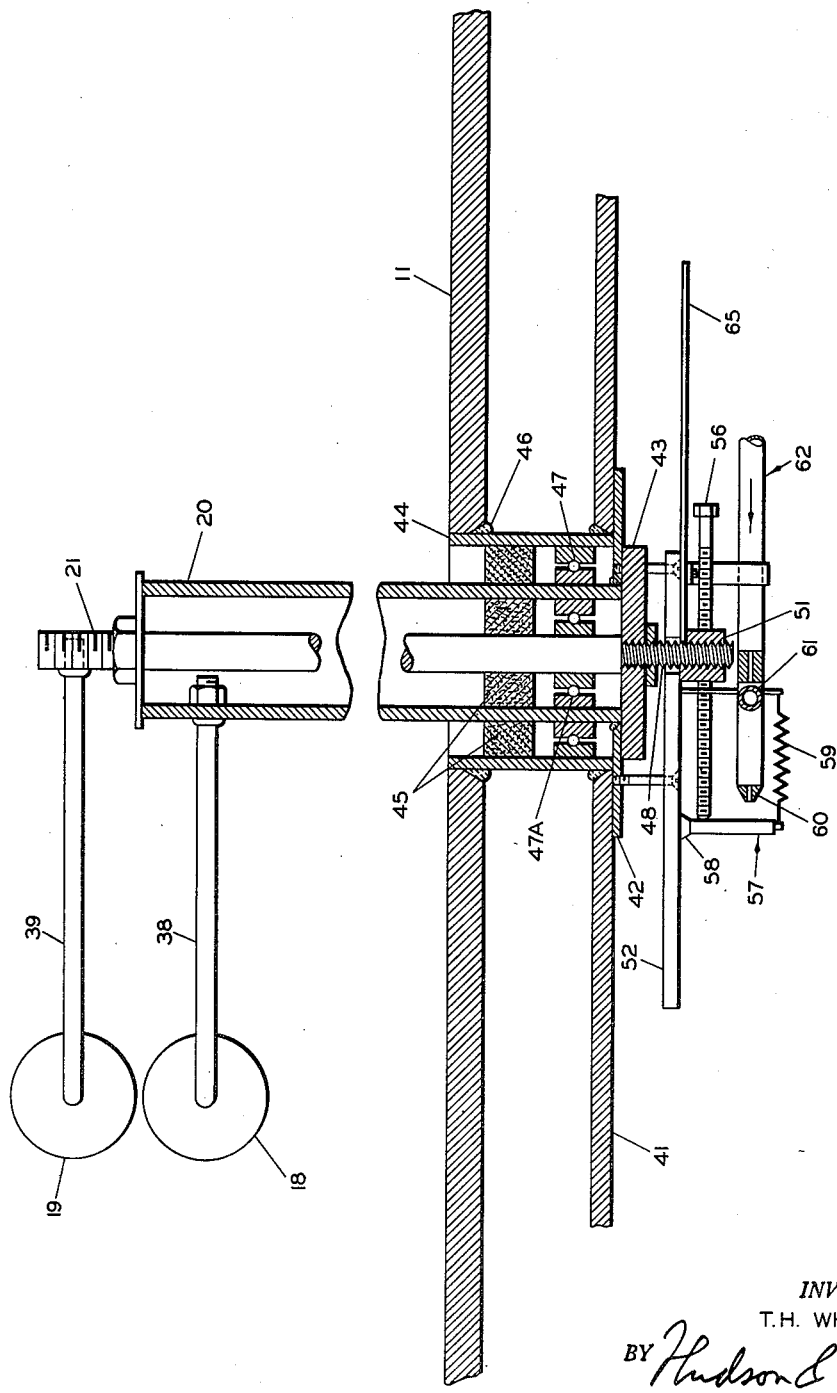
Figure 2 shows a preferred embodiment of one portion of my apparatus, partly in section.

Figure 2 shows a detailed section of the tube and shaft portions of the apparatus which extend through the wall of the vessel 11. Floats 18 and 19 are the same floats as shown in Figure 1, while tube 20 and shaft 21 are likewise the same members shown in Figure 1. Into an opening in the sidewall of vessel 11 is fitted a sleeve 44 which may be attached to the wall by a weld 46, or this attachment may be by any other method as desired. Within the sleeve 44 is placed a bearing 47, then within this bearing 47 is placed the tube 20. Within the tube 20 is placed another bearing 47A and within this latter bearing is placed the shaft 21. These bearings, of course, fit tightly to the sleeve 44, the tube 20 and the shaft 21 in the usual manner, and are adapted to permit easy rotation of the shaft 21 and the tube 20. In order to prevent leakage of the contents of the vessel 11, packings 45 may be provided and inserted as illustrated. The type of this packing or its method of installation is immaterial to my apparatus and may be any type of packing or packing gland which would be suitable for use with the apparatus as herein described. To the outer end of the sleeve 44 is attached a plate or panel 41 which in one embodiment may be substantially square or rectangular in form. This plate 41 is rigidly attached to the sleeve 44 by any method such as welding. To the outer end of the hollow tube 20 extends through an opening in the plate 41 and is attached an annular plate 42. This plate 42 is intended to rotate as tube 20 rotates, rotation being caused by the rising or falling of the heavy float 18.

To the outer end 48 of shaft 21 is attached a circular plate 43. This plate is intended to rotate as shaft 21 rotates, and this rotation in turn is caused by the rising or falling of the light float 19.

Figure 3:
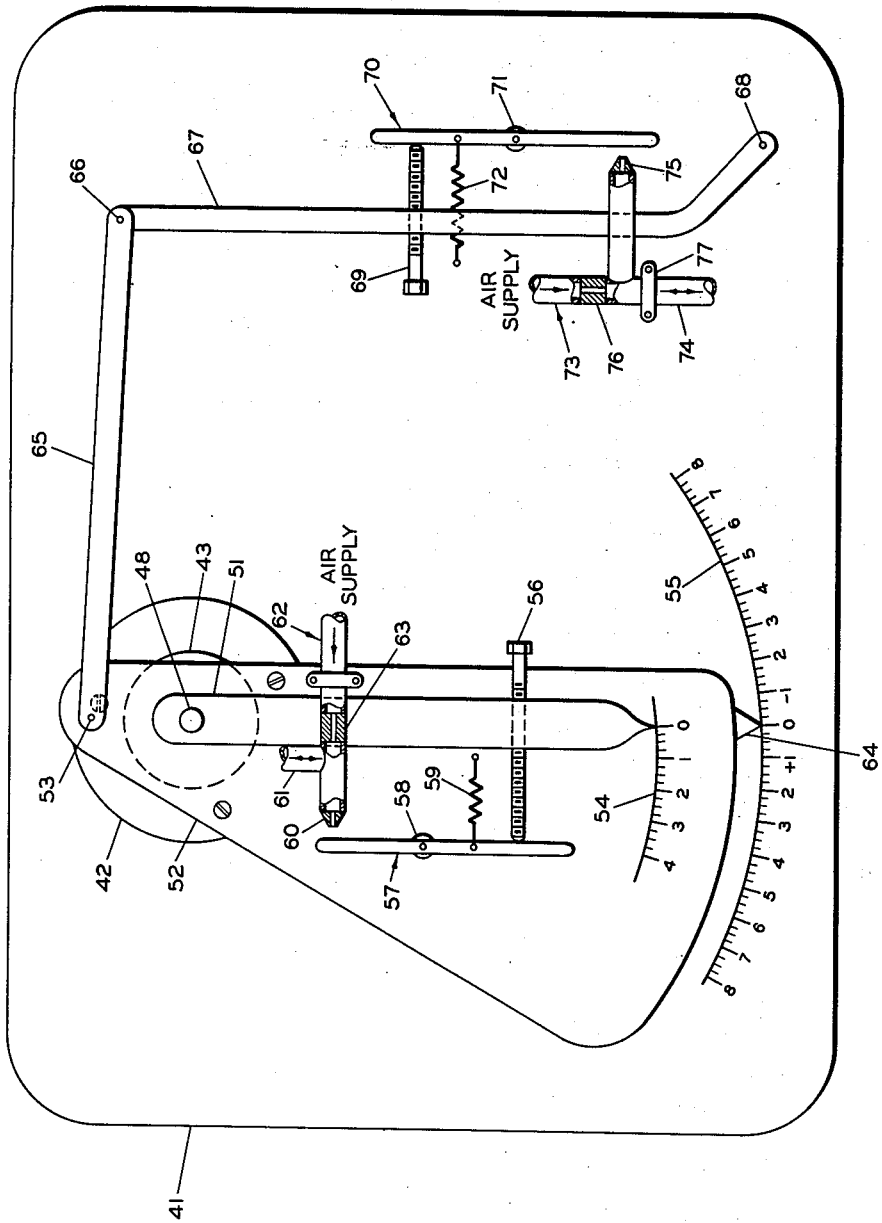
Figure 3 shows one embodiment of the indicator and control panel.

Figure 3 is a detail sketch of a preferred embodiment of the indicating and control apparatus which is mounted on the panel plate 41. To the end 48 (of the shaft 21) is rigidly attached an arm 51. This arm 51 extends downward some distance and terminates in a pointer which is intended to point to numerals on a scale 54.

To the outer end of the tube 20, as mentioned hereinbefore, is attached the annular plate 42 and to this annular plate 42 is attached a member 52. This member 52 accordingly rotates around the center of the shaft 21 but in accordance with the movements of the hollow tube 20. The lower end of this member 52 terminates as a pointer 64 for indicating plus or minus values on the scale 55. Scale 55 is attached directly to the panel plate 41. To the member 52 is rigidly attached a controller mechanism 62 which may consist of a T-tube-orifice-baffle assembly. One arm of the T receives air from a source, not shown, and the air passes through an orifice 63, and through a second orifice 60, pressure being communicated through the leg of the T 61 to the motor of a valve to be controlled. The lower portion of the arm 51 has a threaded opening for accommodation of a bolt 56, one end of which terminates against a baffle or controller flapper 57. This baffle 57 rotates around a pivot point 58 and is held against the end of the bolt 56 by a tension spring 59. The spring 59 is, of course, attached to the base member 52. To the upper end of this base member is attached a linkage arm 65 by means of a pivot 53. The other end of the arm 65 is attached by a pivot 66 to another linkage arm 67. The opposite end of this arm 67 is pivoted at 68 to the panel plate 41, as shown. This arm 67 is provided with a threaded opening for accommodation of a bolt or screw member 69, one end of which has a bolt head for adjustment purposes and the other end terminates adjacent a baffle member 70. This baffle member 70 is pivoted at 71 to the panel plate 41. One end of the baffle member 70 is held tightly against the end of the screw 69 by a tension spring 72. The other end of the baffle 70 is positioned in operating relation to an orifice 75 which is a part of a T member 73, similar to the T member 62. This T member 73 is composed of a tube leading from an air supply, the orifice 76, the orifice 75 and the tube 74. This latter tube leads to and communicates pressure to the motor of the motor valve to be controlled. The T member 73 is attached to the panel plate by attachment 77.

The controller mechanisms 62 and 73 are shown herein as T-tube-orifice-baffle assemblies, but are not so limited since any suitable conventional controller mechanism may be used.

Figure 4:
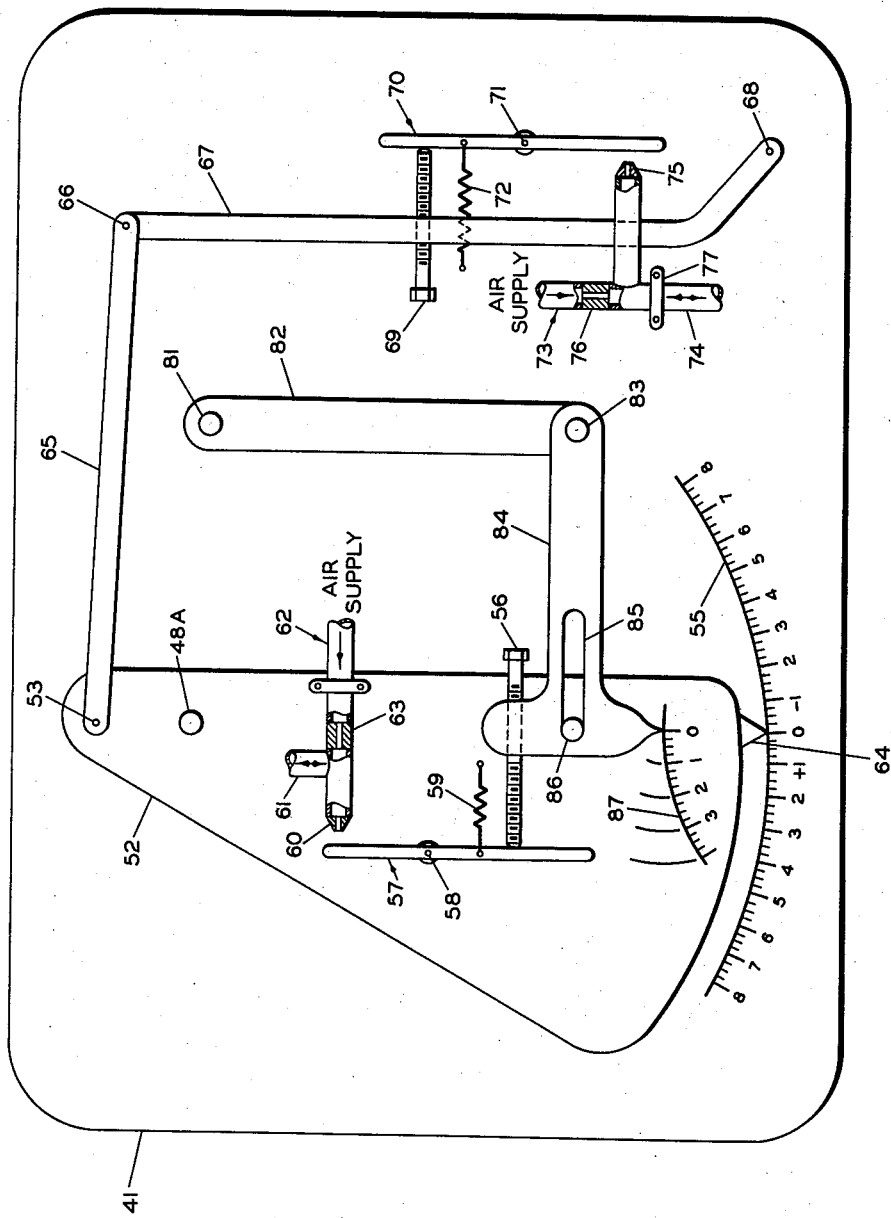
Figure 4 shows a second embodiment of my indicator and control panel.

Figure 4 is somewhat similar to Figure 3 but shows another embodiment of the control end indicating portion of my apparatus. This embodiment contains the same base plate 41 as in Figure 3. To this base plate is attached the member 52, the linkage 65, 67, and the baffle apparatus consisting of the baffle member 70 and the T member 73 and associated parts. The member 52, as in Figure 3, is attached to the annular ring 42 and is accentuated by the rising and falling of the heavy float 18. This member 52 is provided with a nozzle member 62, the baffle member 57 and associated parts and with a scale 87. The member 52 terminates at point 64 as an indicator along scale 55. One end of the arm 82 is attached at a pivot 81 to one end of the light liquid float shaft and at the other end through pivot 83 to an arm 84. Arm 84 has a slot 85 for accommodation of the guide pin 86. Below the guide pin 86, the arm 84 terminates as a pointer pointing to the scale 87 on the member 52. Above the guide pin 86 the arm 84 extends upward a distance sufficient to accommodate a bolt or screw 56, one end of which terminates against the baffle member 57.

The air supply ends of the T-tube 62 and the T-tube 73 should preferably be connected by a flexible tube to another pipe not shown, or directly to a source of air. These flexible connections are necessary on account of the movement of the member parts of my apparatus. In like manner tube 61 should be connected with a section of flexible tubing for communication of pressure to the motor of the motor valve to be controlled, and also tube 74 should be connected by a section of flexible tubing for a similar reason.

In the operation of this apparatus it is intended that as the heavy float 18 rises above a predetermined level the heavy liquid material in the bottom of the vessel 11 will be withdrawn through pipe 14 as controlled by valve 15 until the level of this liquid reaches the predetermined value. This operation may be explained as follows, briefly; by reference to Figure 1, float 18 rises (also see Figure 2) to operate the control box 22 which in turn controls air pressure in line 31 and operates pilot valve 17, which in turn permits passage of air from pipe 35 through pipe 34 to the motor 16. This motor 16 then opens valve 15 which operation permits passage of the heavy phase 12 through line 14 to such disposal as desired. When the level of the heavy liquid phase 12 decreases to a certain position, the float 18 then drops to reverse this operation and valve 15 closes.

In detail, this operation with control panels of Figures 3 and 4 is as follows: When heavy fluid 18 rises the tube 20 rotates clockwise, as does base member 52. Upon this rotation of base member 52, linkage arm 65 moves toward the right as does the upper end of arm 67. This movement of arm 67 around its pivot 68 as the center moves screw 69 toward the right and this movement moves baffle 70 around pivot point 71 so that air flowing through bleed nozzle 75 is closed off or partly closed off. The closing off of the air flowing from bleed nozzle 75 raises the pressure of the air in tube 74 and since tube 74 connects with tube 31, this increase in air pressure is communicated to the top of the pilot valve 17. This increase in pressure opens the pilot valve 17 to permit flow of air from pipe 35 through pipe 34 to the motor 16 and motor 16 accordingly opens the motor valve 15. When motor valve 15 opens, then the lower liquid phase 15 passes out through pipe 14. As the level of the heavy liquid 12 drops, the heavy float 18 drops also and the dropping of float 18 rotates the tube 20 anti-clockwise, which rotation reverses the movement of the linkage arms 65 and 67 to move the baffle 70 farther away from the bleed nozzle 75. Thus, the opening of nozzle 75 permits air to flow therethrough and causes a decrease of pressure in the tube 74. And as mentioned above, since tube 74 is connected with tube 31, pressure in 31 decreases to permit closing of the pilot valve 17 and accordingly this shuts off the air from pipe 35 to pipe 34. Decrease of pressure in pipe 34 then permits motor 16 to close the motor valve 15.

When some lighter liquid 13 accumulates upon the surface of the heavier liquid 12, float 18 still rides upon the surface of the heavier liquid 12 while the lighter float 19 rises with the surface of the lighter liquid.

Briefly, according to the embodiment of Figure 3, as the light liquid phase 13 increases in volume in the vessel 11, the light float 19 rises and rotates the shaft 21 in a clockwise direction. This clockwise rotation of shaft 21 rotates the arm 51 in a clockwise direction around point 48 to move screw 56 toward the left and close the bleed nozzle 60. Air pressure in the tube 61 increases and this pressure increase is communicated to tube 26 (Figure 1) to operate pilot valve 27 and motor 28 and finally to open the motor valve 29. When the liquid level of the lighter phase 13 drops the lighter float 19 drops to reverse the operational steps and accordingly the motor 29 is closed.

In more detail, as float 19 rises, and still according to the embodiment of apparatus of Figure 3, the end 48 of shaft 21 rotates in the clockwise direction. This rotation moves arm 51 also in a clockwise rotation around point 48 as the center. The pointer on the lower end of arm 51 also moves toward the left. This movement moves screw 56 to force the baffle 57 against the bleed nozzle 60 which operation causes the building up of air pressure in the tube 61 and since outlet tube 61 is connected directly with tube 26 of Figure 1, this pressure is communicated through tube 26 to the pilot valve 27. Pilot valve 27 opens to admit air from pipe 32 through pipe 33 to operate the motor 28. Motor 28 accordingly opens the motor valve 29 to permit flow of control fluid through pipe 30. This fluid in pipe 30 may be steam, for example it may be steam for furnishing reboiling heat in reboiler coil 23 in the base of the column 11. The addition of heat to this reboiler will then raise the temperature of the heavier liquid 12 and in turn will cause the lighter liquid 13 to boil away or vaporize. As the lighter liquid 13 disappears as vapor, of course, its liquid level will drop and as the level drops the float 19 drops also to reverse the control steps just mentioned. Reversing of these control steps cause motor valve 29 to close, thereby shutting off the steam in pipe 30 from flowing to the reboiler coil 23.

Thus, in this operation it is seen that as the level of the heavier liquid 12 rises, the member 52 rotates to operate through linkages 65 and 67, to operate the motor valve 15, and this operation is independent of the height of the level of the lighter liquid 13. This operation will be the same whether there is or is not any lighter liquid present. In like manner, when the lighter liquid 13 is present the float 19 operates through shaft 21 to move arm 51 to close the bleed nozzle 60 which, as mentioned, will promote removal of the light liquid 13. All this operation is independent of the position of the level of the heavier liquid. When the level of the heavier liquid drops, the level of the lighter liquid also drops but the volume of the lighter liquid remains the same. When the heavier liquid level drops, the float 18 and the float 19 both drop exactly the same amount and the member 52 and the arm 51 both rotate in a counterclockwise direction and the position of the baffle 57 with respect to the bleed nozzle 60 is not altered in any manner. And in like manner, when the level of the heavier liquid rises both floats 18 and 19 rise in equal amount and cause rotation of the member 52 and arm 51 in a clockwise direction and accordingly the baffle member 57 is not moved with respect to the end of the bleed nozzle 60. The only control which operates when these latter conditions exist is the baffle member 70 with respect to the bleed nozzle 75 and this operation, of course, as mentioned before, controls the level of the heavier liquid.

When the lighter liquid 19 increases in volume, the float 19 rises without imparting any movement whatever to the heavier float 18 and the rising of float 19 causes movement of the arm 51 and thereby movement of the baffle 57 with respect to the bleed nozzle 60 without in any manner causing movement of member 52, linkages 65 and 67 and baffle 70 with respect to bleed nozzle 75.

Thus, it will be seen that the volume of heavier liquid in the bottom of column 11 may be controlled quite independent of the lighter liquid riding on its surface and in like manner the volume of the lighter liquid 13 can be controlled without in any manner affecting the volume of the heavier liquid under it.

Referring to the apparatus of Figure 4 for an embodiment based upon the relative positions of the shaft 21 and the tube 20 in the sidewall of the vessel 11, in which case the tube 20 need not be a tube but may be a shaft exactly like shaft 21. In fact, I prefer that this member be a shaft because it is smaller in diameter, is more easily packed, and the operation of the float is less affected by friction. Thus for the embodiment of Figure 4 there will need be two openings or one large opening in the wall of vessel 11 large enough to pass the two shafts and the two floats. Both shafts may terminate in points similar to point 48 of Figure 3 and this point is also shown in Figure 4. Reference numeral 48A of Figure 4 refers to the end of the shaft upon which is mounted the heavier float while point 81 refers to the end of the shaft upon which is mounted the lighter float. The screw 56 then is moved to the right or to the left by movement of an arm 84 which in turn is moved by an arm 82 through the pivot point 83. Arm 82 is rotated by the shaft terminated at point 81. When the surface of the heavier liquid rises, the operation of the apparatus of Figure 4 is exactly the same as the operation shown in the apparatus of Figure 3. When the level of the lighter liquid rises the arm 82 rotates in a clockwise direction and this rotation in turn moves arm 84 toward the left. This movement pushes screw 56 toward the left and moves the baffle 57 closer to the bleed nozzle 60, which movement will cause an increase of air pressure in tube 61 and the effect of this increase of pressure in tube 61 has been explained hereinbefore.

When the level of the lighter liquid drops, float 19 will drop and this will cause movement of the arm 82 in a counterclockwise direction, which movement will move the baffle 57 farther away from the bleed nozzle 60 and this movement will cause a decrease in pressure in tube 61, and the results of this drop in pressure have also been explained.

Thus, in summing up the operation of the apparatus of Figure 4, when the surface of the heavier liquid rises the surface of the lighter liquid rises also, and the only baffle to operate is 70 and this will operate to cause a removal of some of the heavier liquid. When the lighter float 19 moves, float 18 will not move, and only arms 82 and 84 will move to operate bleed nozzle 60. Thus the volume of the lighter liquid may be controlled independently of the volume of the heavier liquid in vessel 11.

The operation of the lighter float 19 has been explained for controlling steam in line 30 and furnishing reboiling heat to the reboiler coil 23. Float 19 may control other operational steps relative to vessel 11, as for example, furfural feed through line 24a, or hydrocarbon feed stock containing butylene and other hydrocarbons containing four carbon atoms per molecule through the feed line 24. Since the furfural is heavier than the hydrocarbon feed, the furfural will flow downward in the column dissolving the butylene in preference to the other hydrocarbons. In this particular case the temperature of the column is intended to be such that the undissolved hydrocarbons will distill and rise upward and flow in countercurrent relation to the furfural and finally leave the tower through the overhead pipe 40. When the operation is normal, only a heavy liquid consisting of furfural and dissolved hydrocarbons, mainly butylene, will be in the bottom of the vessel and the other hydrocarbons will rise as vapors and leave the tower through pipe 40. Conditions may occur wherein all of the hydrocarbons to be vaporized will not be vaporized and these may then accumulate on the surface of the furfural as a separate and light liquid phase since these other hydrocarbons are less soluble than butylene in furfural. When this condition exists, corrective steps should be taken to remove this lighter liquid phase. The lighter liquid phase may be removed by adding reboiling heat through coil 23 as mentioned before, or the liquid may be "dumped" in a manner similar to the removal of the heavier liquid 12. In this case, the motor 28 will operate the valve 29 and permit flow of the lighter liquid 13 through the line 30 to some desired disposal. Then when the float 19 indicates that all or substantially all of the light liquid 13 is gone, the valve 29 will close.

This light liquid phase may also be controlled by controlling the volume of hydrocarbon feed added to the vessel 11 for processing. If some light liquid accumulates on the surface of the heavier liquid, this step would indicate that too much feed is being passed to the column and valve 29 may be installed in feed line 24 and as the float 19 rises the valve 29 may then close off a portion of the feed to the column having a constant heat input, say by reboiler coil 23. The volume of the lighter liquid will decrease by vaporizing and the vapors passing upward in the tower and out the pipe 40.

In another manner the volume of the lighter liquid 13 may be controlled by controlling the temperature of the hydrocarbon feed entering through feed pipe 24. In this manner as the float 19 rises the motor valve 29 may be operated to permit passage of steam or other heating agent through pipe 30 to a heat exchanger inserted in feed pipe 24. Thus, when the hydrocarbon feed entering the tower 11 through pipe 24 is heated more hydrocarbons will be distilled and less remain as liquid, the level of the lighter liquid will not increase or will decrease until its float operates to close off the heat to the feed line.

The volume of the lighter liquid 13 may further be controlled in a manner similar to that just described by controlling the volume of furfural entering through line 24A, or by controlling its temperature, or other variables.

In some cases in which a large number of trays is required to make a given separation, for example 100 trays, and since it is not ordinarily practical to construct as a single vessel a 100 tray column, such a fractionator may be made in two or more units. The bottoms from the top unit in this case will be added to the top of the bottom unit as the liquid reflux and vapors from the top of this bottom unit will be passed into the bottom of the top unit. Under some conditions the kettle of the top unit may be the point at which a second liquid phase may appear while reboil heat is of course added to the kettle of the bottom section. In this case my dual control apparatus may be installed in the lower portion of the top section while the reboiler coil may be placed in the kettle of the lower section. As mentioned herein my dual control apparatus may be adapted to control reflux to the top of the top section, or to control any other process point desired. In Figure 1 of the drawing a single vessel fractionator is shown for purposes of simplicity.

If desired, the air nozzle assembly 62 of Figures 3 and 4 may be placed on the opposite side of the baffle 57 so that movement of the adjustable screw 56 from right to left will open the nozzle in place of closing the nozzle as shown. Such baffles are usually made of spring steel so that if they touch or exert pressure against the orifice 60, the baffle will bend and will not damage the orifice or any other part of the apparatus. The same holds for the baffle assembly 70 of Figures 3 and 4 in that the air nozzle 73 may be placed on the opposite side of the baffle 70.

In cases in which the embodiment of Figure 4 is used, that is, the two float shafts are separated from one another, these shafts and packing assemblies may be replaced by torque tube assemblies which are known in the art.

My method of control of this two phase condition will have application in any process wherein a second and undesired liquid phase of lower specific gravity may accumulate upon the surface of a liquid phase of higher specific gravity and it is not limited to the example herein given.

While I have shown air pressure means for operating my control system I do not wish to be limited thereby since electrically operated apparatus may also be used. Such electrically operated apparatus is known in the art.

The apparatus may be constructed of conventional materials such as are available on the market. If corrosive materials are being processed, of course, structural material should be selected accordingly.

It will be obvious to those skilled in the art that many variations in my method of control and in the apparatus form may be made and yet remain within the intended spirit and scope of my invention. I do not wish to be limited by the example discussed but only by the appended claims.

Having disclosed my invention, I claim:

1. A dual liquid level responsive device for indicating the levels of two liquid phases wherein one liquid is of low specific gravity and floats upon the surface of the second liquid of high specific gravity, comprising in combination a first float for floating on the surface of said low specific gravity liquid, a second float for floating on the surface of said high specific gravity liquid, a first arm and shaft for converting vertical movements of said first float to rotary movements, a second arm and shaft for converting vertical movements of said second float to rotary movements, a first indicator attached to said second shaft and disposed to rotate therewith, a second indicator attached to said first shaft and disposed to rotate therewith and to rotate relative to said first indicator, said first indicator being for indicating the level of said second liquid and said second indicator being for indicating the level of said first liquid with respect to the level of said second liquid.

2. A dual liquid level responsive device for indicating and controlling the levels of two immiscible liquids wherein one liquid is of low specific gravity and floats upon the surface of the second liquid of high specific gravity, comprising in combination a first float for floating on the surface of said low gravity liquid, a second float for floating on the surface of said high specific gravity liquid, a first arm and shaft for converting vertical movements of said first float to rotary movements, a second arm and shaft for converting vertical movements of said second float to rotary movements, a first indicator and control member attached to said second shaft and disposed to operate therewith, a second indicator and control member attached to said first shaft and disposed to operate therewith and to operate relative to said first indicator and control member, said first indicator and control member being for indicating and controlling the level of said second liquid and said second indicator and control member being for indicating and controlling the level of said first liquid with respect to the level of said second liquid.

3. A dual liquid level responsive device for controlling the levels of two immiscible liquids wherein one liquid is of low specific gravity and floats upon the surface of the second liquid of high specific gravity, comprising in combination a first float for floating on the surface of said low gravity liquid, a second float for floating on the surface of said high specific gravity liquid, a first arm and shaft for converting vertical movements of said first float to rotary movements, a second arm and shaft for converting vertical movements of said second float to rotary movements, a first control member attached to said second shaft and disposed to operate therewith, a second control member attached to said first shaft and disposed to operate therewith and to operate relative to said first control member, said first control member being for controlling the level of said second liquid and said second control member being for controlling the level of said first liquid with respect to the level of said second liquid.

4. A dual liquid level responsive device for indicating the levels of two liquid phases wherein one liquid is of low specific gravity and floats upon the surface of the second liquid of high specific gravity, comprising in combination a first float for floating on the surface of said low specific gravity liquid, a second float for floating on the surface of said high specific gravity liquid, a first arm and shaft for converting vertical movements of said first float to rotary movements, a second arm and shaft for converting vertical movements of said second float to rotary movements, a first indicator member attached to said second shaft and disposed to rotate therewith, a second indicator member attached to said first shaft and disposed to rotate therewith and to move relative to said first indicator member, said first indicator member indicating the level of said second liquid and said second indicator member indicating the level of said first liquid with respect to the level of said second liquid.

5. A dual liquid level responsive device for indicating and controlling the levels of two liquid phases wherein one liquid is of low specific gravity and floats upon the surface of the second liquid of high specific gravity, comprising in combination a first float for floating on the surface of said low specific gravity liquid, a second float for floating on the surface of said high specific gravity liquid, a first arm and shaft for converting vertical movements of said first float to rotary movements, a second arm and shaft for converting vertical movements of said second float to rotary movements, a first indicator member attached to said second shaft and disposed to rotate therewith, a second indicator member attached to said first shaft and disposed to rotate therewith and to move relative to said first indicator member, a first control member attached to said first indicator member and disposed to operate therewith, said first indicator member indicating the level of said second liquid and said second indicator member indicating the level of said first liquid with respect to the level of said second liquid, a second control member attached to said second indicator member and to said first indicator member and disposed to operate therewith.

6. A dual liquid level responsive device for indicating the levels of two liquid phases wherein one liquid is of low specific gravity and floats upon the surface of the second liquid of high specific gravity, comprising in combination a first float for floating on the surface of said low specific gravity liquid, a second float for floating on the surface of said high specific gravity liquid, a first arm and shaft for converting vertical movements of said first float to rotary movements, a second arm and shaft for converting vertical movements of said second float to rotary movements, a first indicator member attached to said second shaft and disposed to rotate therewith, a second indicator member comprising a lever arm secured to said first shaft and disposed to rotate therewith and a link member pivoted to said lever arm and having a lost motion sliding connection with said first indicator whereby the position of said first indicator indicates the level of said second liquid and the relative position of said link member and said first indicator member indicates the level of said first liquid with respect to the level of said second liquid.

7. A dual liquid level responsive device for indicating and controlling the levels of two liquid phases wherein one liquid is of low specific gravity and floats upon the surface of the second liquid of high specific gravity, comprising in combination a first float for floating on the surface of said low specific gravity liquid, a second float for floating on the surface of said high specific gravity liquid, a first arm and shaft for converting vertical movements of said first float to rotary movements, a second arm and shaft for converting vertical movements of said second float to rotary movements, a first indicator member attached to said second shaft and disposed to rotate therewith, a first control member attached to said first indicator member and disposed to operate therewith, a second indicator member comprising a lever arm secured to said first shaft and disposed to rotate therewith and a link member pivoted to said lever arm and having a lost motion sliding connection with said first indicator whereby the position of said first indicator indicates the level of said second liquid and the relative position of said link member and said first indicator member indicates the level of said first liquid with respect to the level of said second liquid; and a second control member attached to said link member and to said first indicator member and disposed to operate therewith.

THOMAS H. WHALEY, Jr.

REFERENCES CITED

The following references are of record in the file of this patent:

UNITED STATES PATENTS

| Number | Name | Date |
| --- | --- | --- |
| 2,445,043 | Souders | July 13, 1948 |